United States Patent [19]

Mueller et al.

[11] Patent Number: 4,840,393
[45] Date of Patent: Jun. 20, 1989

[54] WHEEL SUSPENSION FOR STEERABLE REAR WHEEL ON MOTOR VEHICLES EQUIPPED WITH FRONT WHEEL STEERING ESPECIALLY PASSENGER VEHICLE

[75] Inventors: Rudolf Mueller, Dachau; Ludwig Strasser, Ebersberg, both of Fed. Rep. of Germany

[73] Assignee: Bayerische Motoren Werke Aktiengesellschaft, Munich, Fed. Rep. of Germany

[21] Appl. No.: 151,944

[22] Filed: Feb. 3, 1988

[30] Foreign Application Priority Data

Feb. 3, 1987 [DE] Fed. Rep. of Germany ....... 3703196

[51] Int. Cl.[4] .............................................. B62D 9/00
[52] U.S. Cl. .................................... 280/661; 280/696; 280/701
[58] Field of Search ............... 280/691, 693, 696, 690, 280/698, 701, 661

[56] References Cited

U.S. PATENT DOCUMENTS

| | | | |
|---|---|---|---|
| 4,457,537 | 7/1984 | van der Ohe et al. | 280/661 |
| 4,519,627 | 5/1985 | Shibahata | 280/701 |
| 4,632,413 | 12/1986 | Fujita et al. | 280/112 A |
| 4,671,531 | 6/1987 | Sautter et al. | 280/701 |
| 4,700,972 | 10/1987 | Young | 280/707 |

Primary Examiner—Charles A. Marmor
Attorney, Agent, or Firm—Barnes & Thornburg

[57] ABSTRACT

In a wheel suspension for steerable rear wheels of motor vehicles, especially passenger motor vehicles, which include in a customary manner a front wheel steering system and additionally a rear wheel steering system (four wheel steering system), each rear wheel-wheel carrier is pivotally connected with the vehicle body or the like about a steering axis of rotation by way of cross guide members, which steering axis of rotation is arranged inclined in such a manner that during a deflection not only an inclined positioning of the rear wheel results but at the same time a change of the wheel camber results so that a rapid build-up of the lateral force for the lateral shift of the vehicle is achieved.

23 Claims, 3 Drawing Sheets

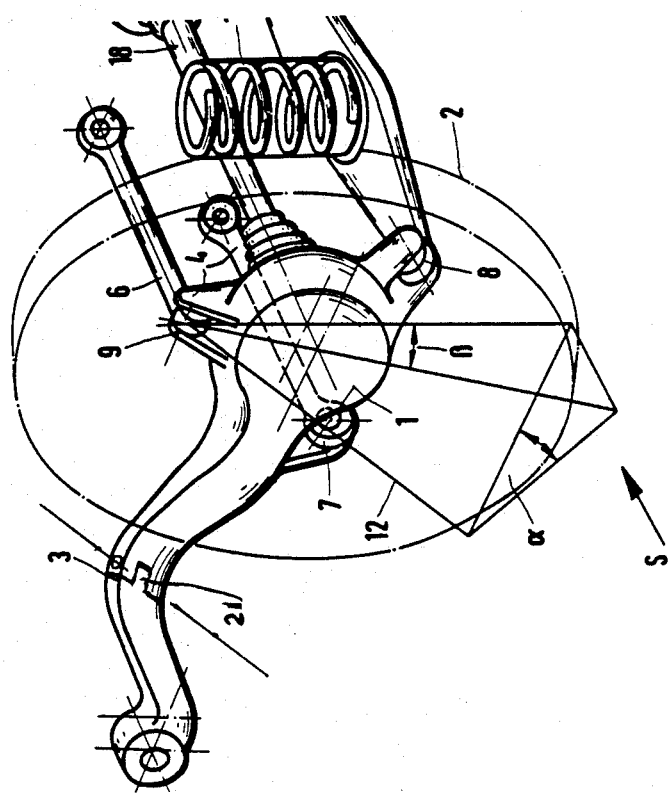

WHEEL SUSPENSION FOR STEERABLE REAR WHEEL ON MOTOR VEHICLES EQUIPPED WITH FRONT WHEEL STEERING ESPECIALLY PASSENGER VEHICLE

BACKGROUND AND SUMMARY OF THE INVENTION

The present invention relates to a wheel suspension for steerable rear wheels of motor vehicles, especially passenger motor vehicles, equipped with a front wheel steering system, which includes one wheel carrier for each rear wheel that is pivotally connected with the vehicle body or the like about a steering axis of rotation by way of a longitudinal guide member extending at least approximately in the vehicle longitudinal direction and cross guide members extending at least approximately in the vehicle transverse direction, of which one cross guide member is displaceable in the vehicle transverse direction by an adjusting motor for purposes of steering.

In a known wheel suspension of this type for front wheel driven vehicles, one spring leg and two cross guide members arranged parallel to one another and one behind the other with a spacing from each other are provided at each rear wheel-wheel carrier, of which the forward one is pivotally connected with its outer end at the lower end of the spring leg and with its inner end at the vehicle body whereas the rear one is connected with its outer end by way of a steering arm also with the lower end of the spring leg and with its inner end with a thrust or connecting rod actuatable hydraulically or by means of an electric motor (DE-OS 35 07 098). An inclined positioning of the rear wheel results with this prior art wheel suspension in case of a steering deflection. The build up of a lateral force which follows in time the adjustment of the slip angle, reaches its magnitude corresponding to the slip angle only after a certain time interval after the initiation of the steering operation. With the relatively small deflection angles which are encountered in rear wheel steering systems particularly at higher driving velocities, at which the lateral force should be available rapidly, the lateral force build-up desired for the lateral shifting of the vehicle, requires considerable time.

In another known wheel suspension of the aforementioned type, a spring leg and two cross guide members parallel to one another and arranged at a distance from one another one behind the other, are provided at each rear wheel-wheel carrier, which cross guide members are pivotally connected with each respective outer end at the wheel carrier and with its inner end at the vehicle body and of which the rear one is not changeable in its length whereas the front one is changeable in its length for steering purposes by means of a hydraulic telescoping unit integrated into the same (JP-OS 60 92 977). An inclined positioning of the rear wheel also results with this prior art wheel suspension during a steering deflection which is followed only in time by the build-up of a lateral force.

In a further known wheel suspension for steerable rear wheels of vehicles equipped with front steering and rear wheel drive (DE-OS 36 23 885), a longitudinal guide member and two cross guide members arranged at least approximately parallel to one another and arranged with a spacing from one another one on top of the other, engage at each rear wheel-wheel carrier (DE-OS 36 23 885). The joints, by way of which the two cross guide members are connected at their outer ends with the wheel carrier, define the steering axis of rotation which rises forwardly. The inner ends of the two cross guide members and the forward end of the longitudinal guide member are secured at an auxiliary frame or subframe. The rear end of the longitudinal guide member is rigidly connected with the rear wheel-wheel carrier. The forward area of the longitudinal guide member is displaceable in the vehicle transverse direction with the aid of an adjusting motor constructed as hydraulic cylinder. A steering deflection of a rear wheel is effected by pivoting the longitudinal guide member about the steering axis of rotation. The inclination of the steering axis of rotation thereby causes a displacement of the rear wheel which acts opposite the build-up of a lateral force in the direction of the desired lateral shift of the vehicle.

A wheel suspension for steerable rear wheels of motor vehicles equipped with front wheel steering is also known (DE-OS 36 09 656) in which the rear wheel-wheel carrier is guided by a longitudinal guide member and an inclined guide member. The inclined guide member, on which is supported a spring leg, is secured with its end on the body side at a tubularly shaped transverse member which is secured at the vehicle body by way of elastic bearings. Inside of the tubularly shaped transverse member, a toothed rack is supported displaceable in the vehicle transverse direction which at its end protruding out of the tubularly shaped transverse member is connected with the forward end of the longitudinal guide member. At their ends on the wheel side, the longitudinal guide member and the inclined guide member are pivotally connected with each other by a joint pin arranged to the rear of the wheel center. The axis of this joint pin, which forms the steering axis of rotation, is arranged inclined rising toward the rear. The steering of the rear wheel is effected in that the toothed rack is displaced in the vehicle transverse direction and the longitudinal guide member is thereby pivoted about the joint pin.

The present invention is concerned with the task to provide a wheel suspension of the aforementioned type in which a rapid build-up of lateral force for the desired lateral shift of the vehicle is assured by simple means in case of a steering deflection of the rear wheels unidirectional with the steering deflection of the front wheels.

The underlying problems are solved according to the present invention in that the joints, by way of which two cross guide members are connected with the wheel carrier, define the steering axis of rotation and the latter is arranged in a plane extending in the vehicle longitudinal direction inclined with respect to a vertical vehicle transverse plane in such a manner that its rises toward the rear. It is achieved thereby that during the drive, especially at higher velocities, with unidirectional steering deflection of the front and of the rear wheels not only a rear wheel inclined positioning, but also a change of the wheel camber results which is effective in the sense of a vehicle displacement or shifting toward the side predetermined by the steering deflection. This leads to a relatively rapid build-up of a lateral force directed correctly from a shifting point of view.

The rapid lateral force build-up to be achieved by the present invention has as a consequence that a desired lateral shift of the vehicle can be achieved already with relatively small deflection angles. The deflection angles which are to be established maximally, can thereby be very small. This leads to a slight space requirement. The space between the rear wheels can therefore be utilized far-reachingly for other purposes, for example, as luggage space.

By reason of the rearwardly rising steering axis of rotation, i.e., inclined for the forward driving direction about a caster angle, in case of unidirectional steering deflection of the rear wheels of the two vehicle sides from the straight position, the camber of the rear wheel on the outside of the curve shifts in a negative direction, i.e., the upper part of the wheel is displaced inwardly, and the camber of the rear wheel on the inside of the curve shifts in a positive direction, i.e., the upper part of the wheel shifts outwardly. Unidirectional lateral displacements result therefor at the rear wheels of the two vehicle sides and therewith unidirected lateral forces which with a unidirectional steering deflection of the front and of the rear wheels act in the direction in which the vehicle is to be shifted laterally by the steering.

The steering axis of rotation may extend through the wheel center as viewed in side view; however, it may also be arranged at a distance therefrom. Depending on the arrangement of the steering axis of rotation, the point in which the steering axis of rotation extends through the tire contact surface (road surface) may be located in front or to the rear of the tire contact point or may coincide with the same. In order to obtain favorable driving conditions for the generally predominantly forward drive, it is advantageous to always arrange the steering axis of rotation in such a manner that a caster of the rear wheel is provided for the forward driving direction. The latter effects the endeavor of the rear wheels to adjust themselves automatically into the straight position and to maintain the same. Additionally, it counteracts any possible flutter tendency of the rear wheels. The magnitude of the caster offset can be determined in a known manner.

A particularly favorable construction is realized according to the present invention if three cross guide members are pivotally connected at the wheel carrier, a triangular arrangement is provided for the joints of the cross guide members at the wheel carrier in which either two joints are below the wheel center and the third joint above the wheel center or two joints are above the wheel center and the third joint is below the wheel center and the respective third joint is arranged between the two other joints as viewed in vertical projection, and the two joints of the cross guide members fixed in the vehicle transverse direction define at the wheel carrier the steering axis of rotation. This construction is particularly compact and advantageous also for the driven rear wheels.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein:

FIG. 3 is a perspective view of the invention shown in FIG. 1 with a pivotal connection for the longitudinal guide member.

DETAILED DESCRIPTION OF THE DRAWINGS

Figure 1:
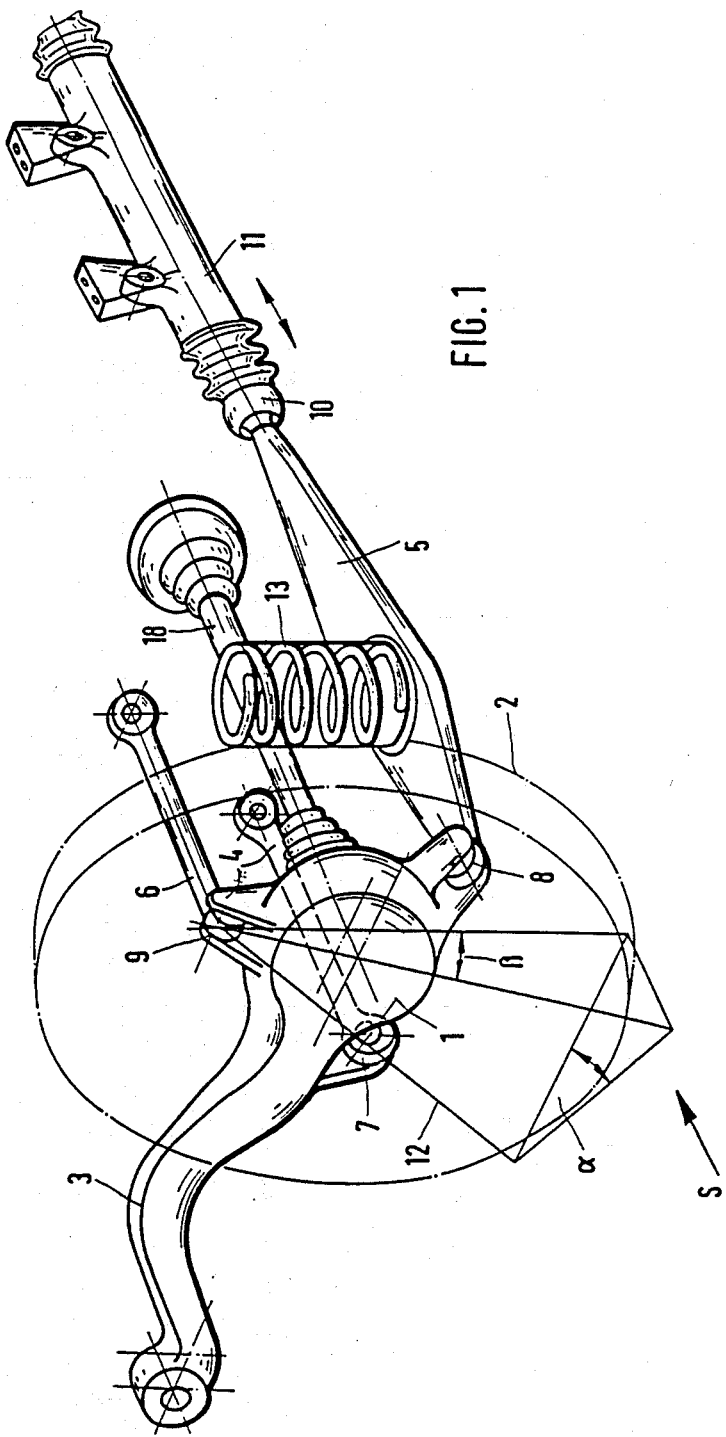
FIG. 1 is a perspective view of a wheel suspension in accordance with the present invention from above, the left and the rear.

Referring now to the drawing wherein like reference numerals are used throughout the two views to designate like parts, and more particularly to FIG. 1, according to this figure, a wheel carrier 1 for the left rear wheel 2 of a passenger motor vehicle, not shown in detail, which is equipped in a customary manner with a front steering system, is constructed in one piece with a longitudinal guide member 3 which extends forwardly from the wheel carrier 1 at least approximately in the vehicle longitudinal direction and is supported at its forward end at the vehicle body. The wheel carrier 1 and longitudinal guide member 3 form together a longitudinal control arm.

A forward cross guide member 4, a rear cross guide member 5, and an upper cross guide member 6 engage at the wheel carrier 1 which extend each at least approximately in the vehicle transverse direction. The cross guide members 4, 5 and 6 are connected with the wheel carrier 1 at their outer ends by way of a forward joint 7, a rear joint 8 and an upper joint 9, respectively. As viewed in side view, the three joints 7, 8 and 9 form the corners of a triangle. The forward joint 7 and the rear joint 8 are located below the wheel center and the upper joint 9 is located above the wheel center. In vertical projection, the upper joint 9 is arranged between the forward joint 7 and the rear joint 8.

At their inner ends, the forward cross guide member 4 and the upper cross guide member 6 are fixedly supported in their longitudinal direction, i.e., in the vehicle transverse direction, at an auxiliary or subframe elastically supported at the vehicle body. The inner end of the rear cross guide member 5 is connected with the left end of a thrust rod or connecting rod 10 of an adjusting motor 11 which is also secured at the auxiliary frame or subframe. The thrust rod or connecting rod 10 which like the rear cross guide member 5 extends in the vehicle transverse direction, is displaceable together with the same in the vehicle transverse direction.

The forward joint 7 and the upper joint 9 of the two cross guide members 4 and 6 fixed in the vehicle transverse direction define a steering axis of rotation 12 which rises rearwardly and about which the wheel carrier 1 together with the longitudinal guide member 3 is pivotal with the assist of the rear cross guide member 5. The left rear support spring 13 of the support springs carrying the vehicle body is supported on the rear cross guide member 5. The place of support for the support spring 13 is arranged spaced approximately one-third of the length of the cross guide member 5 from its outer end, i.e., from the rear joint 8 at the wheel carrier 1. The left rear shock absorber which may form a structural unit together with the support spring 13, is also supported at the rear cross guide member 5 which, in its turn, is supported at its outer end at the wheel carrier 1 and at its inner end at the thrust rod 10. A wheel drive shaft 18 serves for the drive of the rear wheel 2.

During a pivoting of the wheel carrier 1 about the steering axis of rotation 12 effected by the rear cross guide member 5, which steering axis of rotation extends through the centers of the forward joint 7 and of the upper joint 9, an inclined positioning of the rear wheel 2 results about the steering deflection angle alpha. At the same time, a change of the camber of the rear wheel 2 about the camber change angle beta results. This displacement of the rear wheel effects a rapid build-up of a lateral force S which has as a consequence a lateral shift of the vehicle.

By reason of the steering deflection which is only small with the rear wheel steering system, only slight displacements of the cross guide member 5 are required so that also the support of the support spring 13 located on the cross guide member 5 is displaced laterally only slightly during the steering.

The forward joint 7 and the upper joint 9 are appropriately so arranged that the steering axis of rotation 12 extends in such a manner that for the forward driving direction a caster results for the rear wheel 2. The steering axis of rotation 12 must not necessarily extend in a vertical plane extending in the vehicle longitudinal direction. It can also extend in a plane inclined in the vehicle longitudinal direction so that a king-pin axis inclination will result in an advantageous manner for the steering axis of rotation 12.

The forward bearing support of the longitudinal guide member 3 is so constructed that it permits the displacements which the forward end of the longitudinal guide member 3 experiences during the pivot movements about the steering axis of rotation 12.

Figure 2:
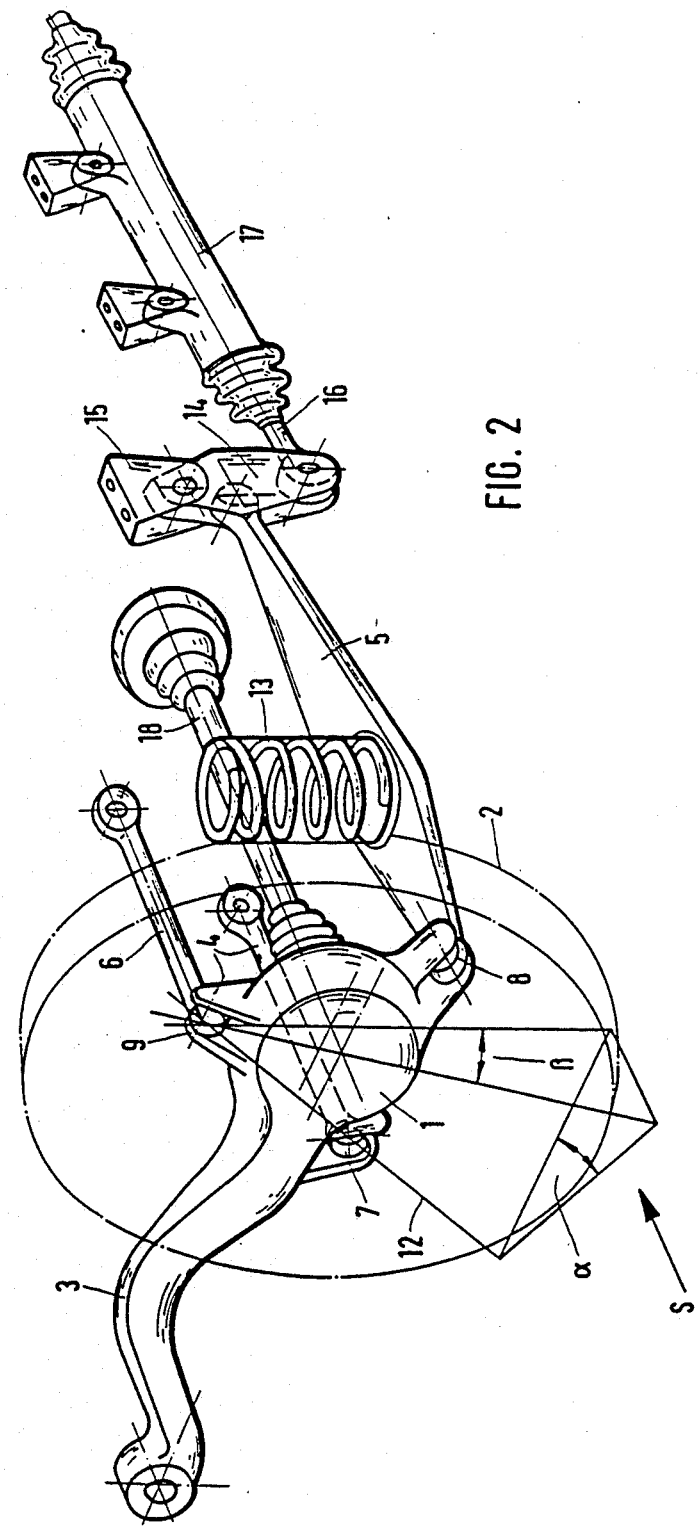
FIG. 2 is a perspective view of a modified embodiment of a wheel suspension in accordance with the present invention, also from above, the left and the rear.

The wheel suspension according to FIG. 2 differs from that according to FIG. 1 in that the inner end of the cross guide member 5 displaceable in the vehicle transverse direction is not pivotally connected at a thrust rod but instead at an intermediate lever 14. This intermediate lever 14 is pivotally supported at the auxiliary frame (not shown) about a pivot axis extending at least approximately in the vehicle longitudinal direction by way of an intermediate connecting member 15. Additionally, the intermediate lever 14 is connected with a thrust rod or connecting rod 16 of an adjusting motor 17. In this construction, the thrust or connecting rod, differing from the construction according to FIG. 1, is not subjected to loads from the support forces of the support spring 13.

Differing from the illustrated embodiments, the cross guide members may be arranged in such a manner that two of the three joints are located above and the third joint is located below the wheel center. This lower joint is thereby so arranged that it is arranged in vertical projection between the two upward joints. With this arrangement, the steering axis of rotation is defined by the joints located at the wheel carrier of the rear upper guide member and of the lower guide member. The forward upper guide member serves for purposes of steering and support of the support spring. However, the arrangement illustrated in FIGS. 1 and 2 offers the advantage of a construction requiring particularly little installation space.

In lieu of being supported at an auxiliary frame or subframe, the cross guide members may also be supported directly at the vehicle body. Additionally, it is possible to construct the longitudinal guide member to be bendable in its length by virtue of being in two pieces that pivotally connect with each other. The two guide member parts having a hinge joint 21 having an axis extending parallel to the steering axis of rotation and permitting transverse movements. Therebeyond, it is also possible to construct the longitudinal control arm bendable in the transverse direction.

The support spring may be constructed, as illustrated in the two embodiments, as coil spring. However, also other types of springs can be used. For example, the support spring may be constructed as pneumatic spring.

The right rear wheel suspension is constructed symmetrically to the left rear wheel suspension explained hereinabove. A simple construction results if a common thrust or connecting rod is provided for the two cross guide members displaceable in the vehicle transverse direction and provided on the left and right vehicle side.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A wheel suspension for steerable rear wheels of motor vehicles equipped with front wheel steering, comprising: wheel carrier means for each rear wheel; each wheel carrier means having a longitudinal guide means connected thereto and extending at least approximately in the vehicle longitudinal direction and pivotally connected to a fixed vehicle part; plural cross guide means extending at least approximately in the vehicle transverse direction and pivotally connected to a fixed vehicle part; additional cross guide means displaceable in the vehicle transverse direction by an adjusting means for providing a steering motion to the rear wheels; and plural joint means each operatively connecting the cross guide means and the additional cross guide means with the wheel carrier means respectively; said plural joint means of the plural cross guide means defining the steering axis of rotation which is arranged in a plane extending substantially in the vehicle longitudinal direction and inclined with respect to a vertical vehicle transverse plane in such a manner that it rises rearwardly.

2. A wheel suspension according to claim 1, wherein the steering axis of rotation is so arranged to provide a caster angle for the rear wheel in the forward driving direction.

3. A wheel suspension according to claim 1, wherein the cross guide means includes two cross guide members with their said joint means pivotally connected at the wheel carrier means to define a triangular arrangement with the joint means of the additional cross guide member at the wheel carrier means, two of the joint means being located at a first and second vehicle height with respect to the wheel center respectively and the third of the three joint means defining the triangular arrangement joint means being located at another vehicle height with respect to the wheel center; and wherein the respective third joint means is arranged at a vertical height between the two other joint means, and wherein said third joint means and one of the other two joint means of the three joint means defining the triangular arrangement having their respective cross guide means fixed in position with respect to the vehicle transverse direction to define the steering axis of rotation at the wheel carrier means.

4. A wheel suspension according to claim 3, wherein the cross guide means and the additional cross guide means are pivotally connected at a common auxiliary frame and the longitudinal guide means is pivotally connected directly at the vehicle body.

5. A wheel suspension according to claim 4, wherein the wheel carrier means is rigidly connected with the longitudinal guide means, and wherein a support at the free end of the longitudinal guide means is so constructed that it permits displacements of the free end of the longitudinal guide means in the vehicle transverse direction and in a vertical direction.

6. A wheel suspension according to claim 5, wherein the wheel carrier means and the longitudinal guide means are constructed in one piece.

7. A wheel suspension according to claim 3, wherein the longitudinal guide means includes a part adjoining the wheel carrier means and a part remote from the wheel carrier means, the part of the longitudinal guide means adjoining the wheel carrier means being rigidly connected with the wheel carrier means, and the two parts of the longitudinal guide means being pivotally connected with each other by a hinge joint means having an axis extending essentially parallel to the steering axis of rotation.

8. A wheel suspension according to claim 7, wherein the part of the longitudinal guide means adjoining the wheel carrier means is constructed in one piece with the wheel carrier means.

9. A wheel suspension according to claim 3, wherein the wheel carrier means together with the longitudinal guide means is connected to pivot about the steering axis of rotation.

10. A wheel suspension according to claim 3, wherein the longitudinal guide means is constructed bendable in transverse direction.

11. A wheel suspension according to claim 3, wherein the additional cross guide means, displaceable in the vehicle transverse direction, supports a support spring means carrying the vehicle body.

12. A wheel suspension according to claim 1, wherein the additional cross guide means displaceable in the vehicle transverse direction is directly pivotally connected at its inner end at a thrust rod means which is operatively connected with the adjusting means.

13. A wheel suspension according to claim 12, wherein the adjusting means is an adjusting motor.

14. A wheel suspension according to claim 12, wherein the additional cross guide means displaceable in the vehicle transverse direction of one wheel carrier means is connected with a common thrust rod means with the additional cross guide means on another vehicle carrier means on an opposite side of the vehicle.

15. A wheel suspension according to claim 1, wherein the additional cross guide means displaceable in the vehicle transverse direction is pivotally connected with its inner end at an intermediate lever which is pivotally supported at a fixed part to pivot about a pivot axis extending at least approximately in the vehicle longitudinal direction and is operatively connected with the adjusting means.

16. A wheel suspension according to claim 3, wherein the steering axis of rotation is so arranged to provide a caster angle for the rear wheel in the forward driving direction.

17. A wheel suspension according to claim 16, wherein the both of the cross guide means are pivotally connected at a common auxiliary frame and the longitudinal guide means is pivotally connected directly at the vehicle body.

18. A wheel suspension according to claim 16, wherein the wheel carrier is rigidly connected with the longitudinal guide means, and wherein the support at the free end of the longitudinal guide means is so constructed that it permits displacements of the free end of the longitudinal guide means in the vehicle transverse direction and in a vertical direction.

19. A wheel suspension according to claim 16, wherein the wheel carrier means and the longitudinal guide means are constructed in one piece.

20. A wheel suspension according to claim 16, wherein the longitudinal guide means includes a part adjoining the wheel carrier means and a part remote from the wheel carrier means, the part of the longitudinal guide means adjoining the wheel carrier means being rigidly connected with the wheel carrier means, and the two parts of the longitudinal guide means being pivotally connected with each other by a hinge joint means having an axis extending essentially parallel to the steering axis of rotation.

21. A wheel suspension according to claim 16, wherein the additional cross guide means displaceable in the vehicle transverse direction supports a support spring means carrying the vehicle body.

22. A wheel suspension according to claim 16, wherein the longitudinal guide means is constructed bendable in transverse direction.

23. A wheel suspension according to claim 3, wherein the the two joint means are located below the wheel center in vertical height and the third joint means is located above the wheel center in vertical height.

* * * * *